United States Patent
Junginger et al.

(10) Patent No.: US 11,899,131 B2
(45) Date of Patent: Feb. 13, 2024

(54) AUGMENTATION AND PROCESSING OF RADAR DATA WITH MACHINE LEARNING

(71) Applicant: Robert Bosch GmbH, Stuttgart (DE)

(72) Inventors: Andrej Junginger, Stuttgart (DE); Michael Johannes Oechsle, Tuebingen (DE); Thilo Strauss, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 17/391,307

(22) Filed: Aug. 2, 2021

(65) Prior Publication Data
US 2022/0065989 A1 Mar. 3, 2022

(30) Foreign Application Priority Data
Aug. 28, 2020 (DE) .................... 10 2020 210 887.0

(51) Int. Cl.
*G01S 7/40* (2006.01)
*G06N 3/08* (2023.01)
*G01S 13/89* (2006.01)

(52) U.S. Cl.
CPC ............ *G01S 7/4082* (2021.05); *G01S 13/89* (2013.01); *G06N 3/08* (2013.01)

(58) Field of Classification Search
CPC .......... G01S 7/4082; G01S 13/89; G06N 3/08
USPC ............... 342/146, 169, 195, 201, 357.29
See application file for complete search history.

(56) References Cited

U.S. PATENT DOCUMENTS

| | | | |
|---|---|---|---|
| 2010/0019957 A1* | 1/2010 | Feria | G01S 13/9029 |
| | | | 342/159 |
| 2015/0236415 A1* | 8/2015 | Bily | H01Q 21/0012 |
| | | | 342/372 |
| 2019/0087667 A1* | 3/2019 | Foroughi | G01S 5/0294 |

FOREIGN PATENT DOCUMENTS

| | | |
|---|---|---|
| DE | 10 2016 210 534 A1 | 12/2017 |
| DE | 10 2018 204 494 B3 | 8/2019 |
| EP | 3 690 753 A1 | 8/2020 |

* cited by examiner

*Primary Examiner* — Bo Fan
(74) *Attorney, Agent, or Firm* — Maginot, Moore & Beck LLP

(57) ABSTRACT

A method is disclosed for converting source radar data of a source configuration of a radar system target radar data of a target configuration. The method comprises: providing a source array of grid cells for source reflex locations; determining, for each respective grid cell in the source array, a probability or frequency that source reflex locations are located in the respective grid cell; forming a source tensor including the source array populated with the probability or frequency for each grid cell; transforming the source tensor into a target tensor including a target array of grid cells for the target reflex locations and indicating the probabilities or frequencies of the target reflex locations for each respective grid cell; and generating the target radar data by sampling the location coordinates of the target reflex locations.

16 Claims, 3 Drawing Sheets

AUGMENTATION AND PROCESSING OF RADAR DATA WITH MACHINE LEARNING

This application claims priority under 35 U.S.C. § 119 to application no. DE 10 2020 210887.0, filed on Aug. 28, 2020 in Germany, the disclosure of which is incorporated herein by reference in its entirety.

TECHNICAL FIELD

The present disclosure relates to the generation of realistic radar data from existing radar data as well as, more generally, the processing of radar data by means of machine learning.

BACKGROUND

In order for a vehicle to be able to move at least partially automatically in road traffic, it is necessary to detect the environment of the vehicle and to initiate countermeasures if there is an imminent risk of collision with an object in the environment of the vehicle. The creation of an environment representation and localization are also necessary for safe automated driving.

The detection of objects using radar is independent of the lighting conditions and is possible, for example, even at night, over greater distances without the oncoming traffic being blinded by high-beam headlights. The radar data also reveal the distance and speed of objects directly. These types of information are important for assessing whether a collision with the objects might occur. However, the type of object is not immediately recognizable from radar signals. This recognition is currently achieved by the calculation of attributes from the digital signal processing.

Trained machine learning models, such as neural networks, can make an important contribution here, particularly for object recognition. To train these models, training data is required, which is often recorded on test drives and then annotated ("labeled") with the objects actually contained in the respective scene. Labeling requires much manual work and is therefore expensive. DE 10 2018 204 494 B3 discloses a generator that can be used to extend a given set of training data with synthetic radar data.

SUMMARY

As part of the disclosure, a method for converting source radar data into target radar data has been developed. The source radar data consists of radar data obtained by observing a scene with a source configuration of a radar system. The target radar data consists of radar data that can be expected when the same scene is observed with a target configuration of a radar system. Both the source configuration and the target configuration of a radar system each comprise at least one transmitter and one receiver for radar radiation and may also be characterized by additional parameters, such as settings of the transmitter and/or the receiver.

The source configuration can be the same as the target configuration. In this case, a given set of radar data for one configuration of the radar system can be extended to include realistic synthetic radar data, such as can be implemented, for example, with the generator mentioned above.

However, the present method can also be used to produce target radar data from source radar data acquired with a source configuration of a radar system, such that the target data can realistically be expected when observing the same scene with a completely different target configuration of the same or another radar system. In this way, the same given set of radar data, which may already have been labeled, can be reused, for example, as training data for object recognition with any new target configurations of a radar system. This saves a considerable amount of effort for the physical recording of additional radar data. If the radar system is carried by a vehicle, the additional effort required for carrying out further test drives, for example, can be drastically reduced.

For example, at a time when a large number of test drives have already been carried out with a radar sensor mounted at a certain position on the vehicle, it may be decided that the radar sensor should be installed at a different position on the vehicle in future. This changes the radar sensor's reception characteristic. In particular, the observable field of view and the perspective are changed. Up to now, the radar data recorded on the previous test drives could no longer be used to train object recognition or another type of evaluation based on radar data acquired from the new position of the sensor. Instead, the recording of the training data had to be started again from scratch.

Even installing the radar sensor in a vehicle from another manufacturer has up to now resulted in the radar data previously recorded for training purposes being no longer usable. Since radar sensors are not visually appealing to every end customer, they are often installed behind the vehicle manufacturer's badge. When passing through these badges, the radar radiation is altered and this effect changes when the badge of one manufacturer is exchanged for the badge of another manufacturer. In this respect, radar data acquired behind a first badge was only partially comparable to radar data acquired behind a second badge. With the present method, this signal change can be artificially generated so that a set of training data acquired behind the first badge can continue to be used even after the first badge has been exchanged for the second badge.

In general, the source radar data or the target radar data comprise at least location coordinates of source reflex locations or target reflex locations respectively, from which reflected radar radiation was incident on the radar system. As part of the method, a two- or multi-dimensional source array of grid cells is first provided for the location coordinates of the source reflex locations. From the location coordinates of all source reflex locations, for each grid cell a probability and/or frequency is determined that one or more source reflex locations will be located in the grid cell, and assigned to the respective grid cell. A source tensor is formed, comprising at least the source array populated with probabilities and/or frequencies.

To this end, for example, a circle or a sphere with a predefined radius around the source reflex location can be assigned an occupancy probability of 1. This occupancy probability can then be distributed to all grid cells of the source array over which the area of the circle or the volume of the sphere is distributed, according to the area proportions or volume proportions.

It has been recognized that the special physical properties of radar radiation observation lead to uncertainties in the radar data. Optical observation, for example with a camera or with a lidar, uses radiation which has an extremely short wavelength compared to the structures to be imaged, and thus delivers very sharp images. In comparison, radar radiation has much longer wavelengths so that the wave properties of the radiation are much more noticeable and the measured reflexes have largely stochastic properties.

In concrete terms, this means that radar reflexes fluctuate over time, i.e., appear and disappear again in successive individual measurements, and fluctuate spatially, i.e., they are subject to fluctuation and noise with respect to the location coordinates of the locations from which the radar radiation seems to come.

The true image of the environment can thus typically only be obtained from radar measurements as an average value from a large number of radar measurements and/or by superposition of the individual measurements.

This uncertainty is largely suppressed in the source tensor, as this source tensor contains variables that characterize the probability distributions of the radar data. The source tensor thus essentially contains the result of a processing of spatial information from the observed scene with a transfer function that is also only spatially variable but time-invariant.

The source tensor is then transformed into a target tensor that includes at least one target array of grid cells for the location coordinates of the target reflex locations. This target array indicates, for each grid cell, a probability and/or frequency that target reflex locations obtained when observing the scene with the target configuration will be located in the respective grid cell. Based on the probabilities and/or frequencies in the target array, location coordinates of target reflex locations are sampled so that the target radar data is generated.

In the simple case mentioned above, in which only a single configuration is used and an available set of radar data for this configuration is to be extended, the source configuration is identical to the target configuration and the source tensor is adopted identically as the target tensor. New samples are then drawn from exactly the same probability distributions that were determined from the original radar data.

By contrast, if the source configuration and the destination configuration are not identical, the target reflex locations are in turn related to the target tensor via a spatial, time-invariant transfer function. The relationship between the source tensor and the target tensor is then based on the differences between the source configuration and the target configuration and is also time-invariant. However, there is usually no closed formula for this relationship. The path from the source tensor to the target tensor is accessible to machine learning, however. This means that the source tensor can be transformed into the target tensor using a trained machine learning model. The machine learning model in turn can be trained with radar data related to the source configuration and radar data related to the target configuration.

The amount of training data required for such training is small compared to the amount of source radar data that usually needs to be converted into target radar data in specific applications. If this amount of source radar data is available and an at least equal amount of target radar data is required, then the effort required to obtain training data and then train a machine learning model, which transforms the source tensor into the target tensor and thus ultimately leads from the source radar data to the target radar data, is significantly less than the effort required to obtain the desired target radar data by direct measurement. In addition, the machine learning model can also be used repeatedly for transforming additional radar data from the source configuration into the target configuration.

As discussed earlier, the source configuration and the target configuration may differ, in particular, for example, to the effect that both configurations comprise different radar sensors, and/or the radar sensors in the two configurations are differently spatially arranged, and/or in both configurations, the radar radiation is influenced in different ways by materials arranged between at least one radar sensor and the observed scene.

Thus, the method presented here has the effect that such a change of configuration does not "devalue" a set of radar data already acquired before the change. Instead, only a trained machine learning model specific to this change needs to be provided, or such a model must be trained.

This means that, on the contrary, the "devaluing" of previously acquired radar data is no longer a valid argument against a desired change of configuration. If it turns out, for example, that a new radar sensor for a vehicle delivers radar data with a significantly better quality than the previously used radar sensor, the repetition of all the test drives carried out so far with the old radar sensor may nevertheless be such a high cost for the transition that, on balance, the transition is no longer economically viable. If this cost is greatly reduced, there is no reason not to make the transition.

In a particularly advantageous embodiment, the machine learning model comprises an encoder-decoder arrangement with an encoder that maps the source tensor on to a representation with reduced dimensionality, and a decoder that maps this representation on to the target tensor. Such an arrangement can be trained in such a way that when the source tensor is compressed to the representation, the encoder essentially leaves out the specifics of the source configuration and obtains the most important information about the observed scene, which is difficult to capture in explicitly formulated conditions. Conversely, the decoder adds the specifics of the target configuration to the compressed representation and thus generates the target tensor.

In a further particularly advantageous embodiment, the machine learning model comprises a generator of a generative adversarial network, GAN. Such a generator can be trained to take source tensors that relate to a source configuration and generate target tensors from them that are either difficult or impossible to distinguish from target tensors generated from actual target radar data in the same way as the source tensor is generated from the source radar data. Such a training process can be performed in tandem with a discriminator trained to distinguish between target tensors generated from source tensors and target tensors generated from actual target radar data. The generator and the discriminator together form the GAN. If this is a CycleGAN, it can be trained even if a lot of source radar data measured with the source configuration and a lot of target radar data measured with the target configuration are available, but no pairs of source radar data and target radar data that relate to the same scene.

The previously described creation of a source tensor from source radar data is suitable not only for generating new radar data that can be used in the same way as radar data that was actually measured with the source configuration and/or with the target configuration of a radar system. Rather, the representation of the source radar data as a distribution of probabilities and/or frequencies in the source tensor is generally advantageous in order to shield the evaluation of the source radar data, such as object recognition or other assignment to classes, against the stochastic fluctuations of the radar reflexes.

Therefore, the disclosure also relates to a method for processing source radar data, obtained by observing a scene with a source configuration of a radar system, with a neural network. The source radar data comprises at least location coordinates of source reflex locations from which reflected radar radiation was incident in the radar system.

In the method a two- or multi-dimensional source array of grid cells is provided for the location coordinates of the source reflex locations. From the location coordinates of all source reflex locations, for each grid cell a probability and/or frequency is determined that one or more source reflex locations will be located in the grid cell, and is assigned to the respective grid cell. A source tensor is formed, comprising at least the source array populated with probabilities and/or frequencies. This source tensor is fed into the neural network.

In this way, the uncertainties that affect the source radar data no longer have an impact on the result delivered by the neural network. Thus, the entire system, which initially records source radar data, processes this source radar data to produce a result and, on the basis of this result, drives a vehicle, for example, more reliably.

For example, the source tensor can map from the neural network on to one or more classes of a predefined classification. For example, these classes can represent objects, the presence of which is indicated by the source radar data. However, the classes can also represent, for example, traffic situations where a vehicle from which the source radar data was acquired is located.

This means in particular that, for example, an output delivered by the neural network can be used to generate a control signal for a vehicle, and the vehicle can be controlled with this control signal.

Regardless of whether the source tensor is to be ultimately used to generate new realistic target radar data or some other processing result, the source tensor and, if applicable, the target tensor can each contain assignments of at least one additional variable that can be derived from the source radar data or from the target radar data to the grid cells of the source array or target array.

In particular, the additional variable can comprise
- a distance between the source radar system and the source reflex location, or between the target radar system and the target reflex location, and/or
- an angle at which the radar radiation was incident on the source radar system or the target radar system, and/or
- a speed of an object at which the radar radiation was reflected, and/or
- an affiliation of an object at which the radar radiation was reflected to one or more classes of a predefined classification, and/or
- a signal strength of the reflected radar radiation.

If a processing result is determined directly from the source tensor with a neural network, the values of the additional variables can be used, for example, to resolve ambiguities in the recognition of objects. For example, if one of the additional variables indicates that an object to which specific source radar reflexes belong is moving independently at a certain speed, then this object cannot be a traffic sign or similar fixed object.

If a target tensor is obtained from the source tensor and target radar data is then obtained from the target tensor, along with the transformation of the source array to the target array it is also possible to learn how the assignment of values of the additional variable to grid cells changes when switching from the source configuration to the target configuration.

For example, if the radar sensor in the target configuration views the scene from a different perspective than in the source configuration, the target radar data will deliver information about different speed components of objects than will the source radar data. Also, for example, the angles at which the radar sensor in the target configuration sees the target reflex locations will be changed relative to the angles at which the radar sensor in the source configuration sees the source reflex locations.

This can be illustrated in a particularly advantageous embodiment, for example, by forming a new value of the additional variable from one or more values of the additional variable for one or more grid cells of the target array which have contributed to the sampling of a specific target reflex location, and attributing this new value to the target reflex location in the target radar data.

In general, combining the source array with additional variables in a source tensor facilitates the reuse of machine learning models that were originally designed for image processing. An image with a plurality of color channels can also be represented as a tensor which has a structure very similar to the source tensor.

In particular, the methods may be fully or partially computer-implemented. Therefore, the disclosure also relates to a computer program with machine-readable instructions which, when executed on one or more computers, cause the computer(s) to execute one of the described methods. In this sense, vehicle control units and embedded systems for technical equipment, which are also capable of executing machine-readable instructions, are also to be considered as computers.

The disclosure also relates to a machine-readable data carrier and/or a download product containing the computer program. A download product is a digital product that can be transmitted over a data network, i.e. downloaded by a user of the data network, and which can be offered for immediate download in an online shop, for example.

Furthermore, a computer can be equipped with the computer program, with the machine-readable data carrier or with the download product.

BRIEF DESCRIPTION OF THE DRAWINGS

Further measures to improve the disclosure are described in more detail below, together with the description of the preferred exemplary embodiments of the disclosure by means of figures.

In the drawings.

DETAILED DESCRIPTION

Figure 1:
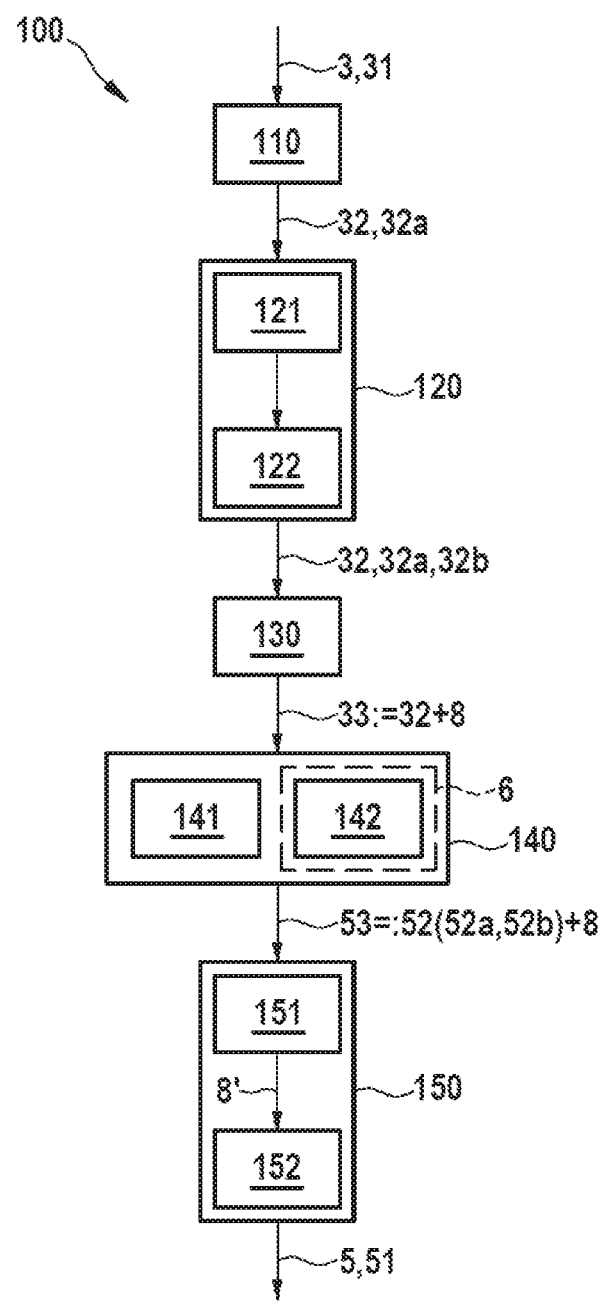
FIG. 1 shows an exemplary embodiment of the method 100 for converting source radar data 3 into target radar data 5.

FIG. 1 shows a schematic flow diagram of an exemplary embodiment of the method 200 for converting source radar data 3 into target radar data 5. The source radar data 3 were obtained by observation of a scene 1 with a source configuration 2 of a radar system. The target radar data 5 are radar data that can be expected when the same scene 1 is observed with a target configuration 4 of a radar system.

The source radar data 3 comprises at least location coordinates of source reflex locations 31 from which reflected radar radiation was incident on the radar system. In step 110, a two- or multi-dimensional source array 32 of grid cells 32a is provided for these location coordinates. From the location coordinates of all source reflex locations 31, in step 120 a probability and/or frequency 32b is determined for each grid cell 32a that one or more source reflex locations 31 are located in the grid cell 32a, and assigned to the respective grid cell 32a.

For this purpose, for example, according to block 121 a circle or a sphere with a predefined radius around the source reflex location 31 can be assigned an occupancy probability of 1. This occupancy probability can then be distributed according to block 122 to all grid cells 32a of the source array 32 over which the area of the circle or the volume of the sphere is distributed, according to the area proportions or volume proportions respectively.

In step 130, a source tensor 33 is formed, comprising at least the source array 32 which is populated with probabilities and/or frequencies 32b. For example, the source tensor 33 can also contain values of additional variables 8 which are each assigned to the grid cells 32a of the source array 32.

In step 140, the source tensor 33 is transformed into a target tensor 53 that contains at least one target array 52 of grid cells 52a for the location coordinates of the target reflex locations 51. This target array 52 indicates for each grid cell 52a a probability and/or frequency 52b that target reflex locations 51 obtained when observing the scene 1 with the target configuration 4 will be located in the respective grid cell 52a.

If the source configuration 2 is identical to the target configuration 4, then for this purpose, for example according to block 141, the source tensor 33 can be adopted identically as the target tensor 53.

If, on the other hand, the target configuration 4 differs from the source configuration 2, then according to block 142, for example, the source tensor 33 can be transformed into the target tensor 53 using a trained machine learning model 6.

In step 150, based on the probabilities and/or frequencies 52b in the target array 52, location coordinates of target reflex locations 51 are sampled so that the target radar data 5 is generated. In particular, according to block 151, from one or more values of the additional variable 8 for one or more grid cells 52a of the target array 52 which have contributed to the sampling of a specific target reflex location 51, a new value 8' of the additional variable (8) can be formed. This new value 8' can then be attributed to the target reflex location 51 according to block 152.

Figure 2:
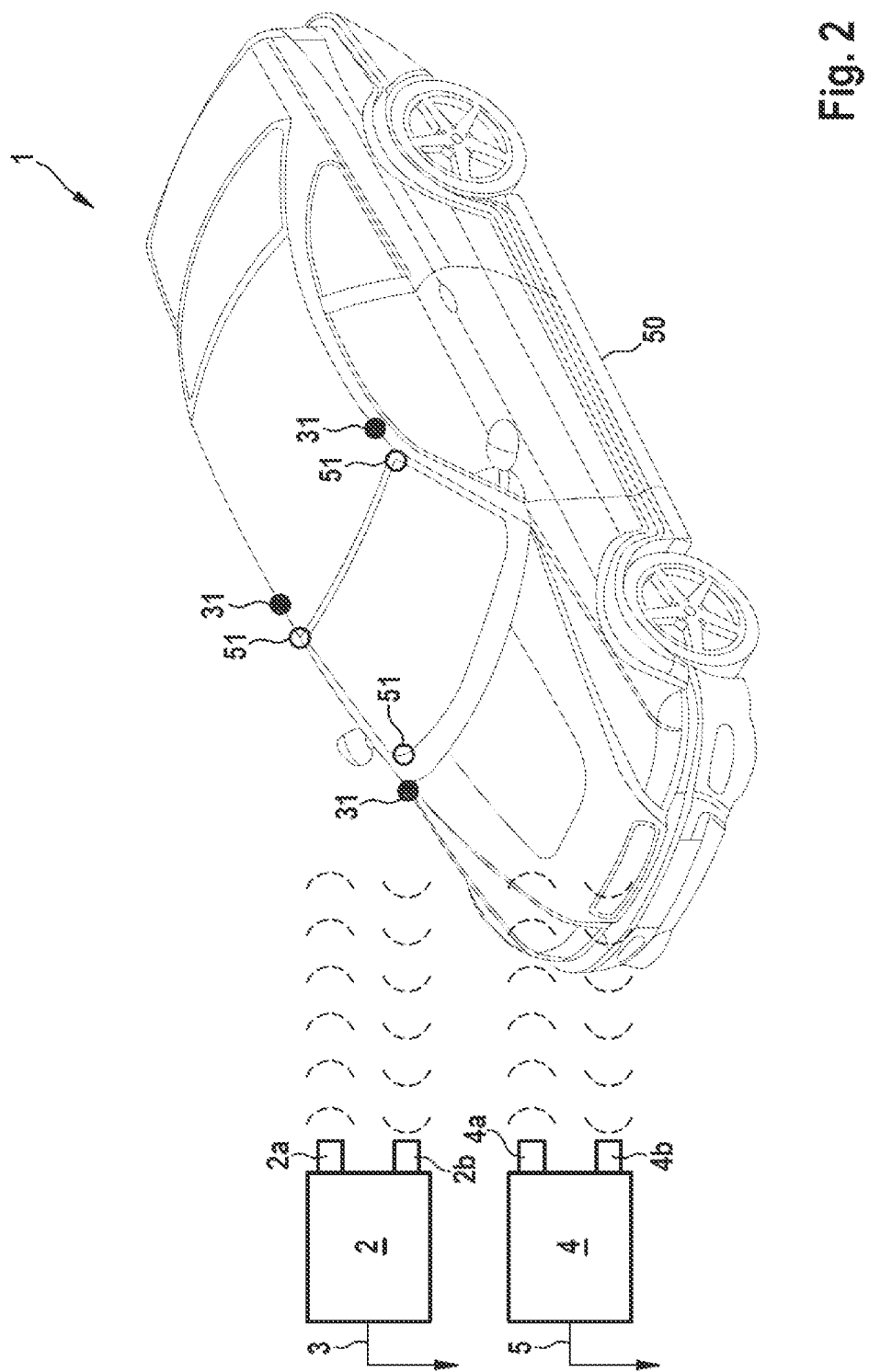
FIG. 2 shows an exemplary situation in which a vehicle 50 with different configurations 2, 4 is observed by radar systems.

FIG. 2 illustrates schematically how and why source radar data 3 of a scene 1, obtained with a source configuration 2 of a radar system, differs from target radar data 5 obtained with a target configuration 4 of the same or another radar system at the same scene 1.

In the example shown in FIG. 2, the scene 1 shows a vehicle 50. With the source configuration 2, which comprises a transmitter 2a and a receiver 2b, radar reflexes are registered at source reflex locations 31, only three of which are drawn in FIG. 2 for the sake of clarity. With the target configuration 4 on the other hand, which comprises a transmitter 4a and a receiver 4b at a different spatial position, radar reflexes are registered at target reflex locations 51, only three of which are drawn in FIG. 2 for the sake of clarity.

Figure 3:
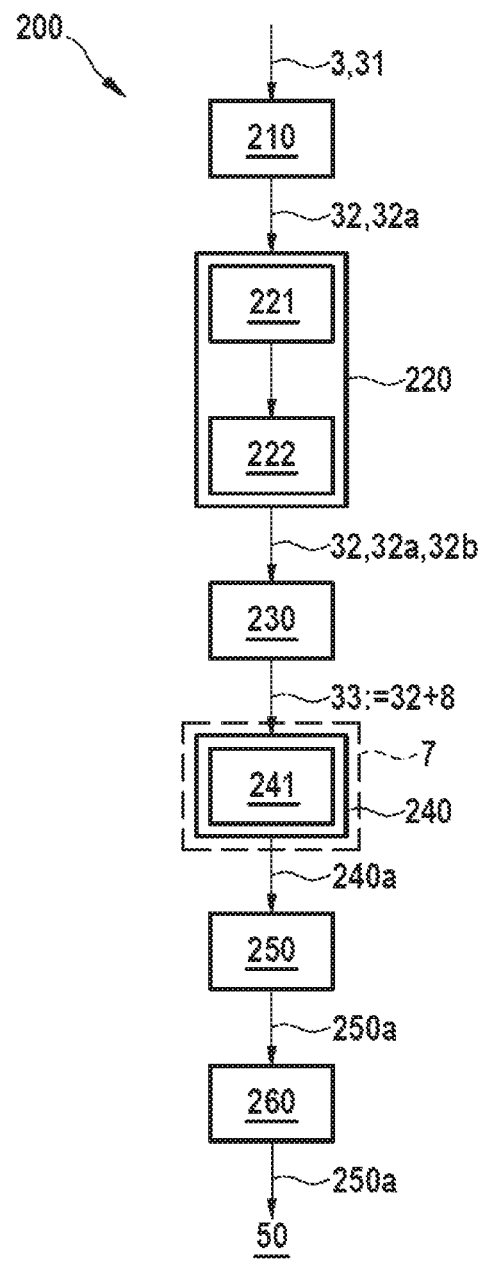
FIG. 3 shows an exemplary embodiment of the method 200 for processing source radar data 3 with a neural network 7.

FIG. 3 is a schematic flow diagram of an exemplary embodiment of the method 200 for processing source radar data 3. This method begins initially in the same way as the method 100 described above.

As in the method 100 described above, the source radar data 3 comprises at least location coordinates of source reflex locations 31, reflected radar radiation from which was incident on the radar system. In step 210, a two- or multi-dimensional source array 32 of grid cells 32a is provided for these location coordinates. From the location coordinates of all source reflex locations 31, in step 220 a probability and/or frequency 32b is determined for each grid cell 32a that one or more source reflex locations 31 are located in the grid cell 32a, and assigned to the respective grid cell 32a.

For this purpose, for example, according to block 221 a circle or a sphere with a predefined radius around the source reflex location 31 can be assigned an occupancy probability of 1. This occupancy probability can then be distributed according to block 222 to all grid cells 32a of the source array 32 over which the area of the circle or the volume of the sphere is distributed, according to the area proportions or volume proportions respectively.

In step 230, a source tensor 33 is formed, comprising at least the source array 32 which is populated with probabilities and/or frequencies 32b. For example, the source tensor 33 can also contain values of additional variables 8 which are each assigned to the grid cells 32a of the source array 32.

In step 240, the source tensor 33 is fed into a neural network 7 and processed by this neural network 7 into an output 240a. In this case, the source tensor 7 can be mapped in particular on to one or more classes of a predefined classification, for example.

In the example shown in FIG. 3, in step 250, from the output 240a a control signal 250a is generated for the vehicle 50, and in step 260 the vehicle 50 is controlled with the control signal 250a.

What is claimed is:

1. A method for converting source radar data, obtained by observing a scene with a source configuration of a radar system, into target radar data that can be expected when the scene is observed with a target configuration of the radar system, the source radar data including location coordinates of source reflex locations from which reflected radar radiation was incident on the radar system, the target radar data including location coordinates of target reflex locations from which reflected radar radiation will be incident on the radar system, the method comprising:
   providing a source array of grid cells for the location coordinates of the source reflex locations, the source array being one of two-dimensional and multi-dimensional;
   determining, from the location coordinates of all of the source reflex locations, for each respective grid cell in the source array, at least one of a probability and a frequency that at least one source reflex location is located in and assigned to the respective grid cell;
   forming a source tensor that includes the source array populated with the at least one of the probability and the frequency for each grid cell in the source array;
   transforming the source tensor into a target tensor that includes at least one target array of grid cells for the location coordinates of the target reflex locations, the target array indicating, for each respective grid cell in the target array, at least one of a probability and a frequency that the target reflex locations obtained with the target configuration during observation of the scene will be located in the respective grid cell;
   generating the target radar data by sampling, based on the at least one of the probability and the frequency for each grid cell in the target array, the location coordinates of the target reflex locations.

2. The method according to claim 1, wherein:
the source configuration is identical to the target configuration; and
the source tensor is adopted identically as the target tensor.

3. The method according to claim 1, wherein:
the source configuration differs from the target configuration; and
the source tensor is transformed into the target tensor using a trained machine learning model.

4. The method according to claim 3, wherein the source configuration differs from the target configuration in that at least one of (i) the source configuration and the target configuration comprise different radar sensors, (ii) a radar sensor is spatially arranged differently in the source configuration compared to the target configuration, and (iii) the reflected radar radiation is influenced differently by materials arranged between a radar sensor and the observed scene, in the source configuration compared to the target configuration.

5. The method according to claim 3, wherein the machine learning model has an encoder-decoder arrangement including (i) an encoder configured to map the source tensor onto a representation with reduced dimensionality and (ii) a decoder configured to map the representation onto the target tensor.

6. The method according to claim 3, wherein the machine learning model has a generator of a generative adversarial network.

7. A method for processing source radar data, obtained by observing a scene with a source configuration of a radar system, the source radar data including location coordinates of source reflex locations from which reflected radar radiation was incident on the radar system, the method comprising:
providing a source array of grid cells for the location coordinates of the source reflex locations, the source array being one of two-dimensional and multi-dimensional;
determining, from the location coordinates of all of the source reflex locations, for each respective grid cell in the source array, at least one of a probability and a frequency that at least one source reflex location is located in and assigned to the respective grid cell;
forming a source tensor that includes the source array populated with the at least one of the probability and the frequency for each grid cell in the source array;
feeding the source tensor into a neural network.

8. The method according to claim 7 further comprising:
mapping, with the neural network, the source tensor onto at least one classes of a predefined classification.

9. The method according to claim 7 further comprising:
forming a control signal for a vehicle from an output supplied by the neural network; and
controlling the vehicle with the control signal.

10. The method according to claim 1, wherein:
the source tensor includes assignments of at least one additional variable, which is derived from one of the source radar data and the target radar data, to the grid cells of the source array; and
the target tensor includes assignments of the at least one additional variable to the grid cells of the target array.

11. The method according to claim 10 further comprising:
forming, and attributing to a specific target reflex location of the target reflex locations in the target radar data, a new value of the at least one additional variable, based on at least one value of the at least one additional variable for at least one grid cell of the target array which have contributed to the sampling of the specific target reflex location.

12. The method according to claim 10, wherein the at least one additional variable comprises at least one of:
a distance between one of (i) the radar system in the source configuration and the source reflex locations and (ii) the radar system in the target configuration and the target reflex locations;
an angle at which the reflected radar radiation one of (i) was incident on the radar system in the source configuration and (ii) will be incident on the radar system in the target configuration;
a speed of an object at which the reflected radar radiation was reflected;
an affiliation of an object at which the reflected radar radiation was reflected to at least one class of a predefined classification; and
a signal strength of the reflected radar radiation.

13. The method according to claim 1, wherein one of a circle and a sphere with a predefined radius around one of the source reflex locations is assigned an occupancy probability of 1 and the occupancy probability is distributed over all grid cells of the source array over which one of an area of the circle and a volume of the sphere is distributed, according to one of area proportions and volume proportions respectively.

14. The method according to claim 1, wherein the method is carried out by a computer program containing machine-readable instructions which are executed on at least one computer.

15. The method according to claim 14, wherein the computer program is stored on a non-transitory machine-readable data carrier.

16. A computer having a non-transitory machine-readable data carrier that stores a computer program containing machine-readable instructions for converting source radar data, obtained by observing a scene with a source configuration of a radar system, into target radar data that can be expected when the scene is observed with a target configuration of the radar system, the source radar data including location coordinates of source reflex locations from which reflected radar radiation was incident on the radar system, the target radar data including location coordinates of target reflex locations from which reflected radar radiation will be incident on the radar system, the computer being configured to execute the machine-readable instructions to:
provide a source array of grid cells for the location coordinates of the source reflex locations, the source array being one of two-dimensional and multi-dimensional;
determine, from the location coordinates of all of the source reflex locations, for each respective grid cell in the source array, at least one of a probability and a frequency that at least one source reflex location is located in and assigned to the respective grid cell;
form a source tensor that includes the source array populated with the at least one of the probability and the frequency for each grid cell in the source array;
transform the source tensor into a target tensor that includes at least one target array of grid cells for the location coordinates of the target reflex locations, the target array indicating, for each respective grid cell in the target array, at least one of a probability and a frequency that the target reflex locations obtained with the target configuration during observation of the scene will be located in the respective grid cell;

generate the target radar data by sampling, based on the at least one of the probability and the frequency for each grid cell in the target array, the location coordinates of the target reflex locations.

* * * * *